United States Patent [19]
German

[11] Patent Number: 5,599,038
[45] Date of Patent: Feb. 4, 1997

[54] METHOD AND APPARATUS FOR LOWERING THE SUSPENSION OF A VEHICLE

[76] Inventor: Mark K. German, 73 Gilmore St., Uniontown, Pa. 15401

[21] Appl. No.: 403,439

[22] Filed: Mar. 14, 1995

[51] Int. Cl.$^6$ ............................................... B60G 11/02
[52] U.S. Cl. ............................................................ 280/718
[58] Field of Search .............................................. 280/718

[56] References Cited

U.S. PATENT DOCUMENTS

| | | | |
|---|---|---|---|
| 2,631,682 | 3/1953 | Gale | 280/718 |
| 3,083,034 | 3/1963 | Hollowell | 280/718 |
| 3,434,734 | 3/1969 | Poulos | 280/718 |
| 4,125,276 | 11/1978 | Levasseur | 280/718 |
| 4,342,469 | 8/1982 | Corner et al. | 280/718 |
| 5,137,300 | 8/1992 | Walton | 280/718 |

*Primary Examiner*—Kenneth R. Rice
*Attorney, Agent, or Firm*—Price & Adams

[57] ABSTRACT

A leaf spring suspension at the rear of a vehicle is lowered on a vehicle frame by relocating the leaf springs below an axle housing that extends between rear wheels transversely on the frame. A spring pack connects the lowered leaf springs to the axle housing The spring pack includes a saddle having a recessed portion for receiving and supporting the axle housing on the leaf springs. The saddle recessed portion is positioned between the axle housing and the leaf springs. A first spring plate is positioned below the leaf springs underlying the saddle. A second spring plate is supported by the saddle above the axle housing. Hex head bolts with threaded ends extend through aligned holes in the first and second spring plates. Nuts are tightened on the bolts threaded ends below the first spring plate to tension the bolts and clamp together the leaf springs and the axle housing with the weight of the leaf springs transferred by the spring plates clamped to the saddle to the axle housing.

20 Claims, 5 Drawing Sheets

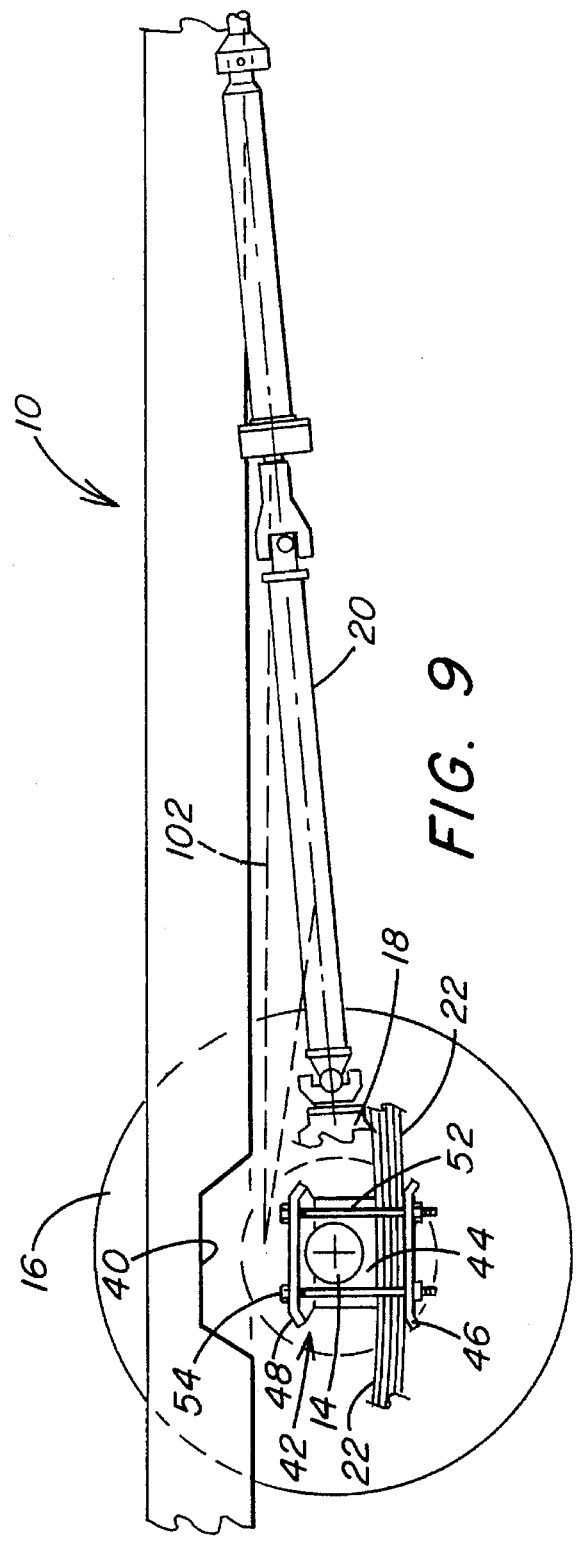
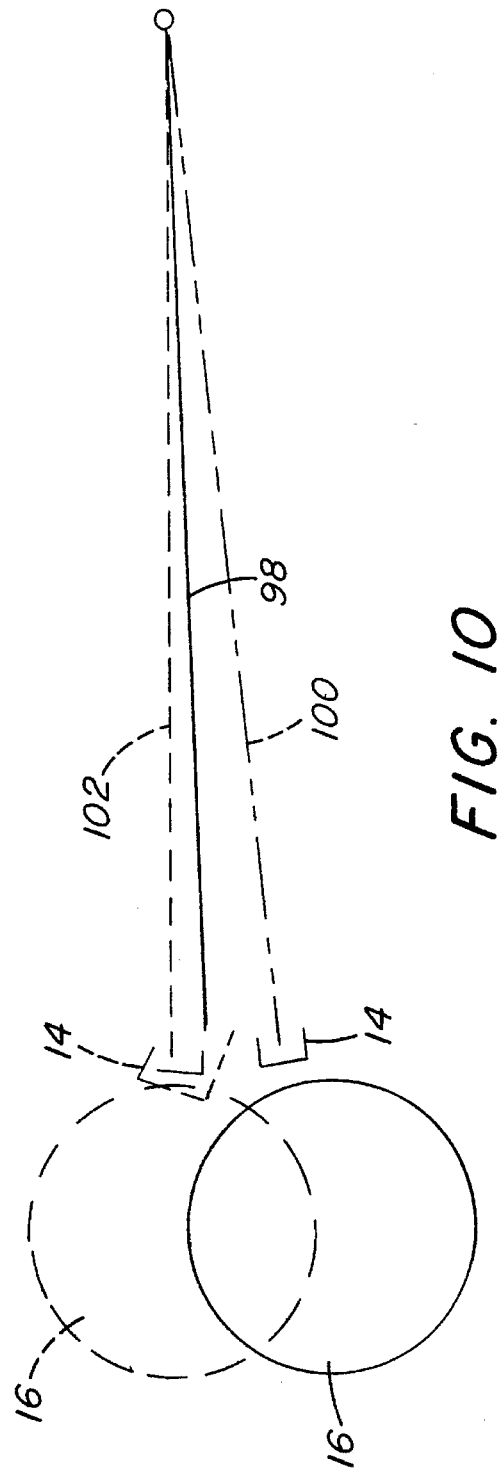

METHOD AND APPARATUS FOR LOWERING THE SUSPENSION OF A VEHICLE

BACKGROUND OF THE INVENTION

1. Field of the Invention

This invention relates to method and apparatus for lowering the suspension on a vehicle and more particularly to apparatus for relocating the leaf springs of the suspension below the axle housing to lower the frame where the load supporting the leaf springs is transferred from the axle to a mounting assembly surrounding the axle housing.

2. Description of the Prior Art

In a conventional suspension system for a vehicle leaf springs are utilized to support the axle housing on the vehicle frame so that when the wheel strikes minor obstacles in the road the shock forces are transmitted through the axle to the springs. The springs then serve to dampen the vibration that is transmitted to the vehicle body.

The leaf springs are connected to the frame adjacent the rear wheels of the vehicle. The opposite ends of the springs are connected by tension-type shackles or brackets to the vehicle frame. The leaf springs are positioned above the axle housing. The springs are connected to the axle housing by a hanger assembly that includes in one embodiment a pair of U-bolts that are positioned on opposite sides of the leaf springs and extend upwardly around the axle housing into a bolted connection with an anchor plate. The anchor plate extends in overlying relation with the leaf springs and is connected to the vehicle frame.

In certain applications it is desirable to lower the vehicle frame with respect to the axle housing. This is accomplished by decreasing the vertical distance between the vehicle frame and the axle housing so as to lower the floor height of the vehicle. This is advantageous in a vehicle such as a bus to make it easier for passengers to enter and exit the bus. Lowering the frame of a vehicle is also desirable in the customization of vehicles, such as trucks, so that the frame ground clearance is lower to provide desired aesthetic affects.

In order to decrease the distance between the vehicle frame and the axle housing it is necessary to relocate the leaf springs from above the axle housing to a position below the axle housing. This requires a modification in the hanger assembly for connecting the leaf springs to the axle housing. Apparatus for supporting leaf springs below the axle housing are well known in the art. One example is disclosed in U.S. Pat. No. 2,868,538 where the leaf springs of the vehicle suspension are mounted below and clamped to the axle housing by U-bolts which pass around the axle and extend through the top plate of an angle clamp and a bottom plate. Nuts on the ends of the U-bolts are tightened against the bottom plate. The leaf springs are compressed by a bolt passing through the plate at the top and the plate at the bottom of the springs. In a similar arrangement U.S. Pat. No. 4,342,469 discloses in a trailer suspension system leaf springs mounted below an axle by U-bolts and retaining plates.

In U.S. Pat. No. 3,494,609 a spring beam is coupled to an axle housing by U-bolts. The bolts straddle the axle housing and a pressure plate is positioned at the bottom of the spring beam through which the legs of the U-bolt pass. Nuts are tightened on the U-bolt against the pressure plate. Italian Pat. No. 647561 discloses leaf springs clamped below the axle between a pair of pressure plates. Legs of a U-bolt pass through the pressure plates, and nuts on the end of the U-bolt are tightened to compress the leaf spring between the pressure plates.

In U.S. Pat. No. 3,103,349 an axle housing is secured to leaf springs by a set of four bolts that pass through a pair of brackets, an upper plate, and a lower plate so as to secure the brackets and the plates together about the leaf springs. The upper and lower plates are positioned beneath the axle housing by shackles.

U.K. Pat. Application No. 2,141,677A discloses a vehicle lowering suspension system for buses in which bolts are used to clamp together upper and lower plates to secure the leaf springs to the axle housing. U.S. Pat. Nos. 2,258,449; 3,285,281; 3,861,708; and 4,966,387 are further examples of leaf suspension systems in which the leaf springs are supported by U-bolts beneath the axle housing.

A problem is encountered with a lowering suspension system in which the leaf springs are supported by U-bolts beneath the axle housing. The U-bolts have a tendency to slip on the axle because the tops of the U-bolts do not sit squarely on the axle. Slippage or lateral movement of the U-bolts has been known to dislodge the mounting of the leaf springs on the axle, causing damage to the axle.

In a vehicle lowering suspension system, the vertical distance between the vehicle frame and the top of the axle housing is decreased. This reduces the clearance for movement of the axle housing relative to the vehicle frame. In order to accommodate the decreased distance between the vehicle frame and the top of the axle housing the vehicle frame is provided with a C-section above the axle to increase the clearance at the point where the axle passes beneath the frame. This allows for upward and downward travel of the frame without interfering with the axle housing.

In a further effort to dampen movement of the axle housing a shock absorber is mounted on opposite ends of the axle housing adjacent the vehicle frame. One end of the shock absorber is connected by a bracket to the axle housing and the opposite upper end of the shock absorber is connected to a bracket mounted on the vehicle frame. For the shock absorber to operate efficiently in dampening motion of the axle, the shock absorber should be positioned at 45° angle with respect to the horizontal. However, when the vehicle frame is lowered with respect to the axle housing and the shock absorber is connected to the same mounting brackets on the frame and axle, the shock absorber is positioned at an angle less than 45° and approaches a horizontal position. At an angle substantially less than 45° the shock absorber will not operate properly to dampen motion transmitted to the vehicle frame.

Another problem encountered with lowering the suspension of a vehicle where the leaf springs are positioned below the axle housing is displacement of the drive shaft angle. In a conventional suspension system where the leaf springs are positioned above the axle housing the drive shaft extends at an angle of approximately 6° below the horizontal. With conventionally known vehicle lowering suspension systems positioning the leaf springs below the axle housing and decreasing the vertical distance between the vehicle frame and the axle housing raises the drive shaft to a position that is substantially horizontal. Raising the drive shaft to this degree is known to result in vibration or "chatter" of the drive shaft placing undue wear on the connections from the crank shaft to the universal joint.

While it is known in vehicle lowering suspension systems to decrease the clearance between the vehicle frame and axle housing by positioning the leaf springs below the axle housing the prior art devices utilize U-bolts that extend into overlying contact with the axle housing and into connection with a spring plate to hang the leaf springs below the axle housing. This arrangement creates undesired loading of the axle housing. It also places undesirable stress on the drive shaft because it dislocates the angle of the drive shaft. Also, adjustments must be made to connect the shock absorbers at the desired operational angle between the vehicle frame and axle housing.

Therefore, there is need in a vehicle lowering suspension system to support the leaf springs below the axle housing in a manner that removes the load from the axle housing and maintains the drive shaft as close as possible to the preferred angle extending between the crank shaft and the universal joint.

SUMMARY OF THE INVENTION

In accordance with the present invention there is provided apparatus for lowering the suspension system on a vehicle frame that includes an axle housing extending transversely relative to the vehicle frame. A leaf spring assembly extends longitudinally on the vehicle frame underlying the axle housing. The leaf spring assembly has opposite end portions. Brackets on the frame are connected to opposite ends of the leaf spring assembly. A saddle is positioned on the leaf spring assembly for receiving the axle housing. A spring pack is supported by the saddle for connecting the leaf spring assembly to the axle housing. The spring pack includes a first spring plate underlying the leaf spring assembly below the axle housing and a second spring plate overlying the saddle above the axle housing. A plurality of elongated fastening members extend between the first and second spring plates. The fastening members are placed under tension to compress the leaf spring assembly into engagement with the axle housing transfer the weight of the leaf spring assembly through the spring pack and saddle to the axle housing.

A principal object of the present invention is to provide method and apparatus for lowering the suspension on a vehicle to decrease the vertical distance between the axle housing and the vehicle frame by mounting the leaf spring assembly below the axle housing.

Another object of the present invention is to lower the suspension of a vehicle by mounting the leaf spring below the axle by a pair of spring plates compressed together to connect the axle housing and leaf spring to transfer the weight of the leaf spring to the axle housing.

A further object of the present invention is to provide a kit for converting a conventional leaf spring suspension system where the leaf spring is positioned above the axle housing to a position where the leaf spring is mounted below the axle housing by a spring pack that prevents relative movement between the leaf spring and axle housing.

Another object of the present invention is to provide method and apparatus for lowering the frame of a vehicle on the vehicle suspension where the angle of the drive shaft between the crank shaft and universal joint is maintained in a preselected alignment to avoid unwanted vibration transmitted to the drive shaft by lowering the vehicle suspension.

These and other objects of the present invention will be more completely disclosed and described in the following specification, the accompanying drawings, and the appended claims.

BRIEF DESCRIPTION OF THE DRAWINGS

FIG. 9 is a fragmentary schematic view in side elevation of the drive connection to the rear axle housing of a vehicle, illustrating the frame lowered in accordance with the present invention.

FIG. 10 is a diagrammatic illustration of the angle of the drive shaft shown in solid for the lowering vehicle suspension system of the present invention in comparison with the angle of the drive shaft shown by the dashed line below the solid line for a suspension system where the leaf spring is positioned above the axle housing and drive shaft angle shown by dashed line above the solid line for the known prior art lowering suspension systems.

DESCRIPTION OF THE PREFERRED EMBODIMENTS

Figures 1, 2:
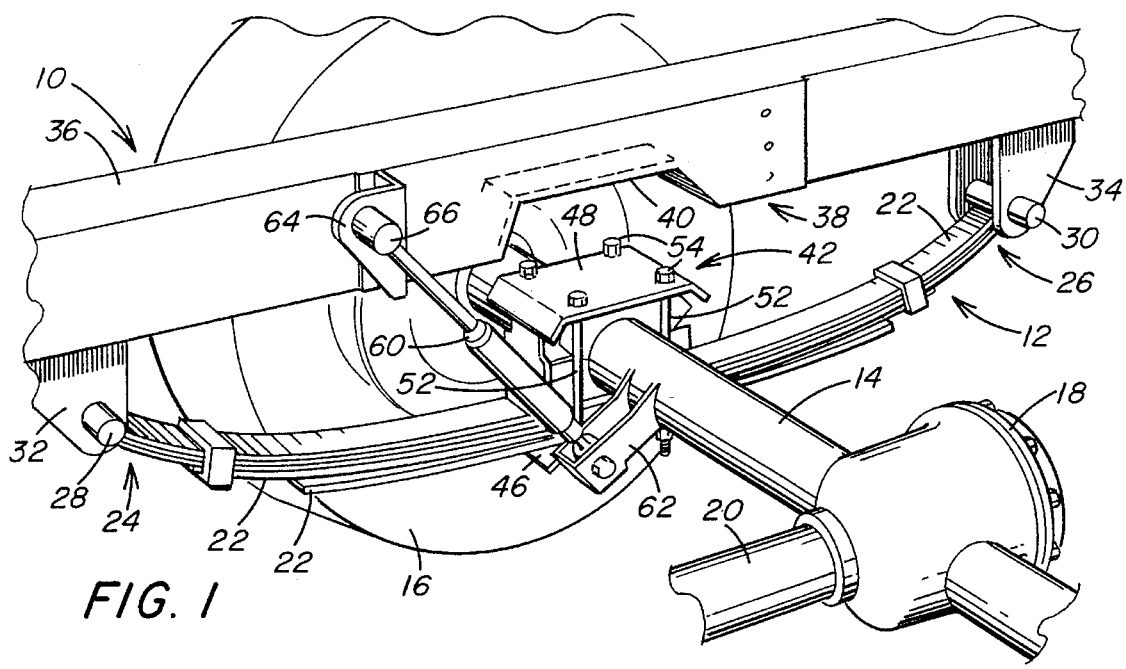
FIG. 1 is a fragmentary isometric view of a suspension system at the rear of a vehicle, illustrating lowering the vehicle frame relative to the axle housing by mounting the leaf springs below the axle housing in accordance with the present invention.
FIG. 2 is an exploded isometric view of the kit for converting a conventional vehicle suspension to a lowered vehicle suspension in accordance with the present invention.
Figure 4:
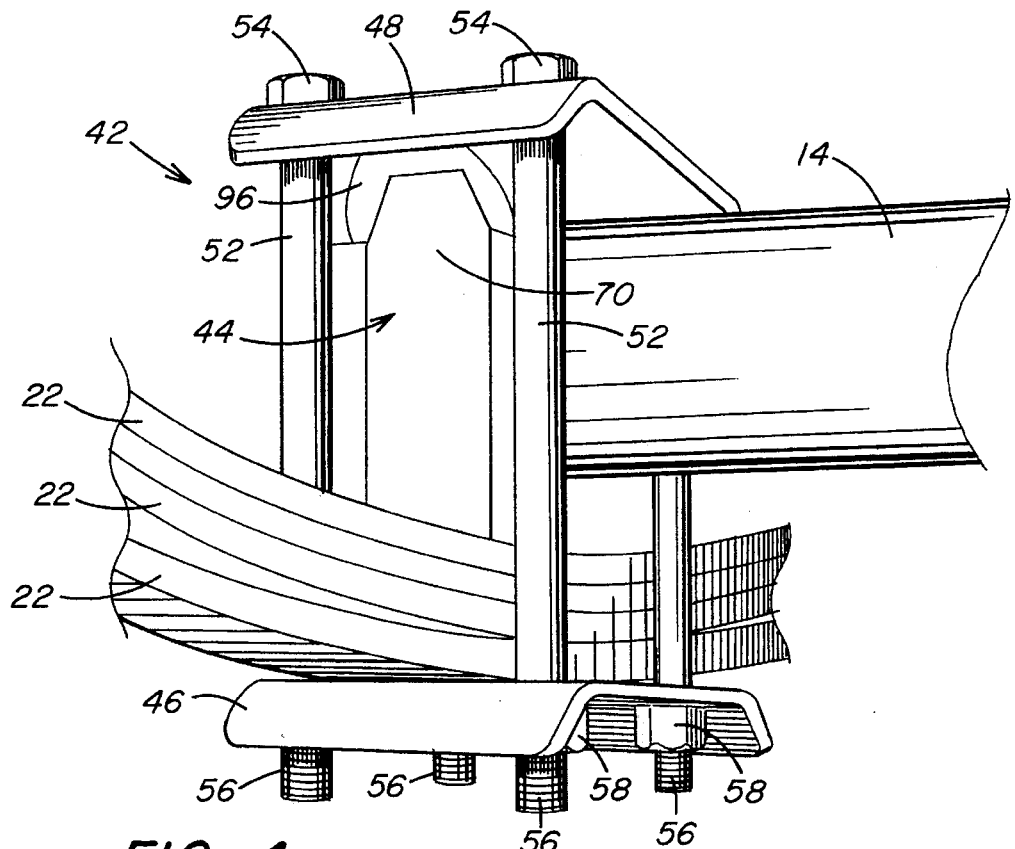
FIG. 4 is a fragmentary schematic view of an assembly for mounting the leaf springs below the axle housing without transferring the weight of the leaf springs by U-bolts to the axle housing as encountered with the prior art arrangement.

Referring to the drawings and particularly to FIGS. 1, 2, and 4 there is illustrated a frame generally designated by the numeral 10 of a vehicle, such as a truck, that is connected by a suspension system generally designated by the numeral 12 to an axle housing 14 that supports wheels 16, one of which is illustrated in FIG. 1 at the rear of the vehicle. The axle housing 14 extends from a universal joint 18 that transmits rotation from a drive shaft 20 through the axle housing 14 to the wheels 16 to rotate the wheels and propel the vehicle.

The suspension system 12 is a leaf spring suspension that includes a plurality of individual leaf springs 22 of the semi-elliptical type that connect the vehicle frame 10 to the axle housing 14 to dampen the vibration and movement transmitted from the wheel 16 through the axle housing 14 to the frame 10. The leaf springs are maintained in overlying assembled arrangement having opposite end portions generally designated by the numerals 24 and 26 connected to bushings 28 and 30 carried by shackles 32 and 34. The shackles 32 and 34 are welded to extend downwardly from the bottom of a channel shaped beam 36 of the vehicle frame 10. The channel shaped beam 36 extends substantially the length of the vehicle and includes a reinforced C-shaped section 38 spanning the axle housing 14. The section 38 has a recessed portion 40 positioned immediately above the axle housing 14.

Figure 3:
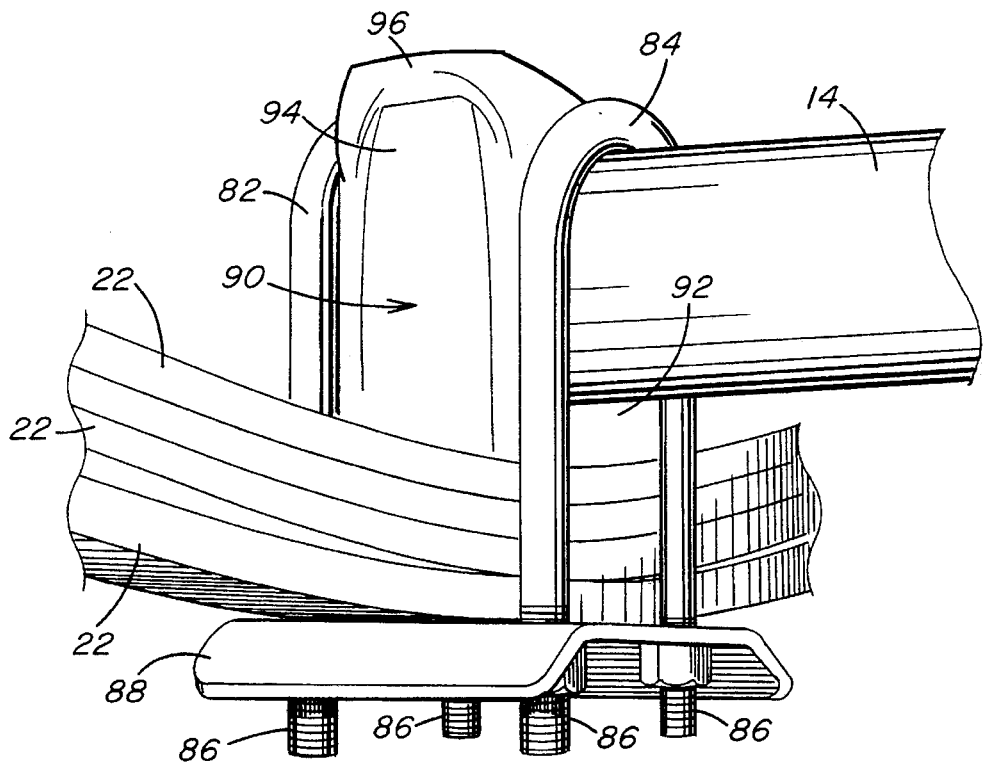
FIG. 3 is a schematic isometric view of the prior art arrangement for lowering a suspension by mounting the leaf spring assembly below the axle housing.

The rear axle housing 14 is connected to the frame 10 by the leaf springs 22. The leaf springs 22 are in turn connected to the axle housing 14 by a spring pack assembly generally designated by the numeral 42 and illustrated in detail in FIG. 2. The spring pack 42 of the present invention connects the axle housing 14 to the leaf springs 22 without the use of U-bolts for hanging the leaf springs from the axle housing as known in the prior art connection as shown in FIG. 3.

With the present invention the leaf springs 22 are connected to the axle housing 14 without the weight or the load of the suspended leaf springs is transmitted to the axle housing 14 through the spring pack 42. With the present invention of the spring pack 42 the weight or load of the leaf springs 22 is taken up by the spring pack 42 which is mounted by the saddle assembly 44 on the axle housing 14.

Figure 5:
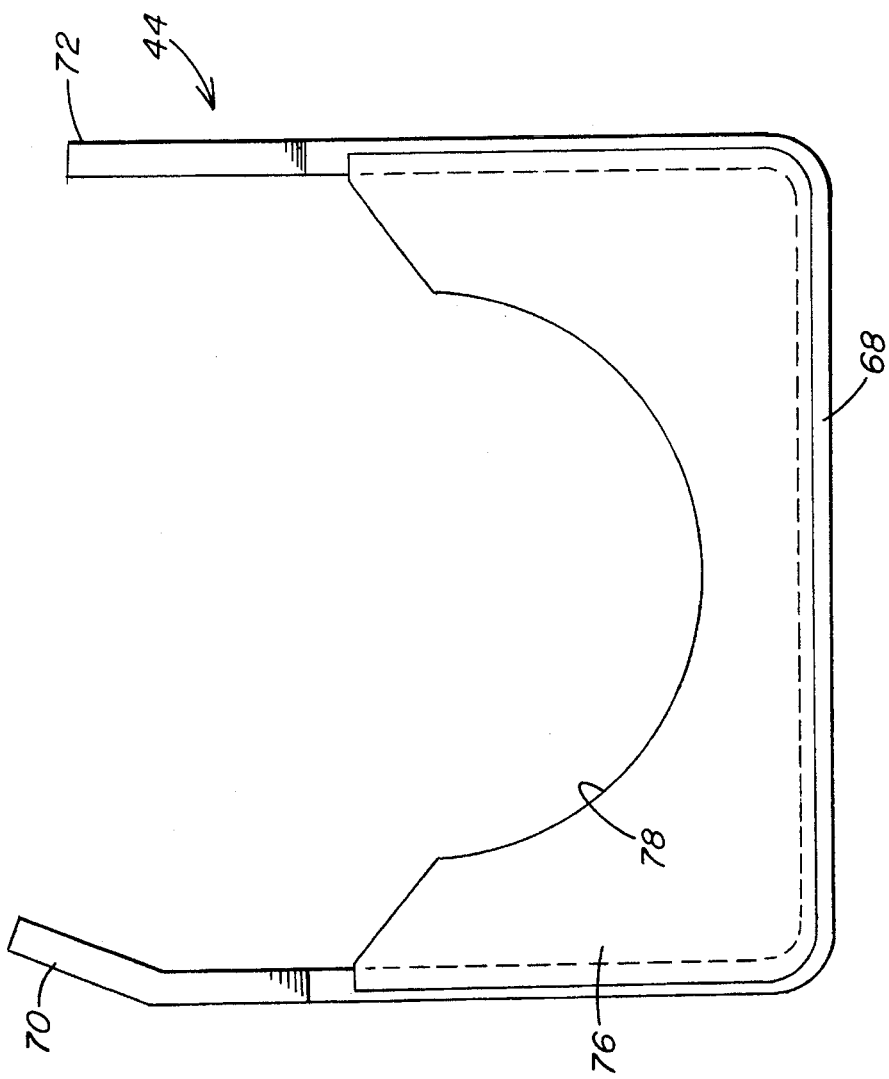
FIG. 5 is a side elevational view of a saddle assembly for supporting the axle housing above the leaf springs.
Figure 6:
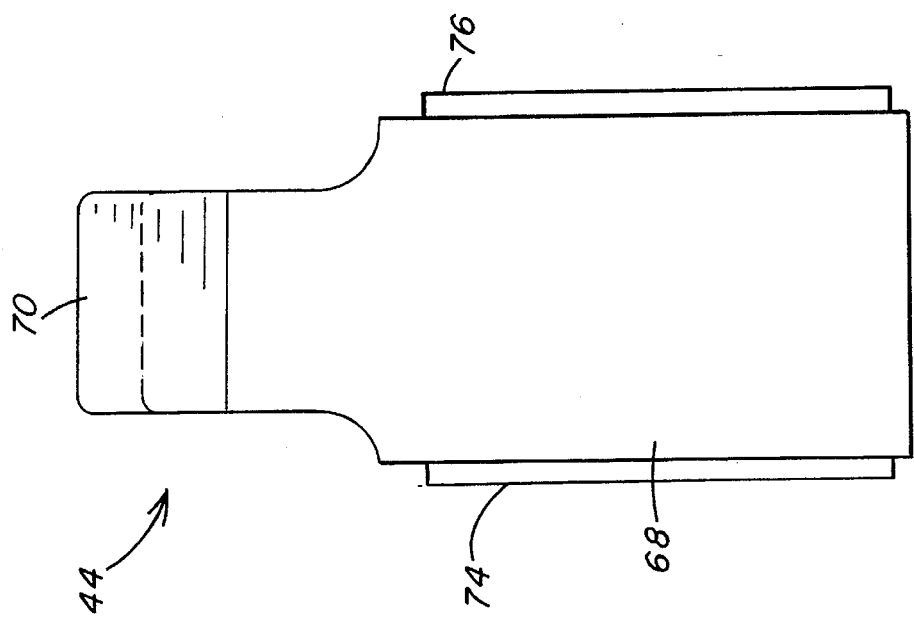
FIG. 6 is an end view of the saddle assembly shown in FIG. 5.
Figure 8:
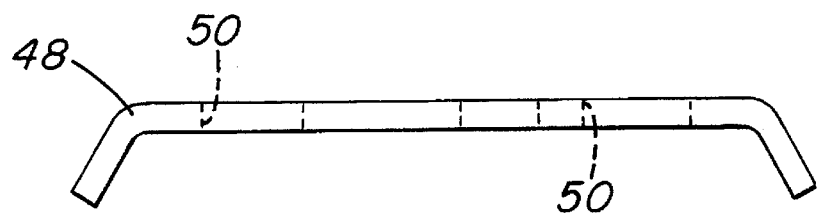
FIG. 8 is a side elevational view of the spring plate shown in FIG. 7.
Figure 7:
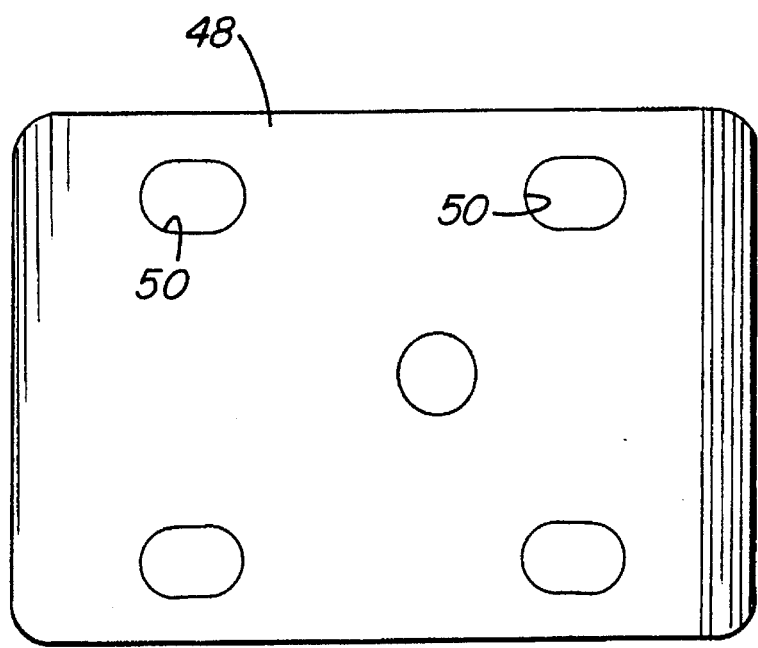
FIG. 7 is a plan view of one of the spring plates for mounting the leaf spring assembly below the axle housing.

As illustrated in FIG. 2, the spring pack 42 includes a saddle assembly generally designated by the numeral 44 and illustrated in FIGS. 5 and 6. The axle housing 14 is supported by the saddle assembly 44 which extends upwardly in surrounding relation therewith. The leaf springs 22 are positioned beneath the saddle assembly 44. A pair of spring plates 46 and 48 are positioned in clamping engagement above and below the saddle assembly 44. The lower spring plate 46 is positioned, as shown in FIG. 4, in underlying relation with the leaf springs 22 below the axle assembly 14 so that the leaf springs 22 extend between the bottom of the saddle assembly 44 and the top of the lower spring plate 46.

The upper spring plate 48 is supported by the upper end of the saddle 44 above the axle housing 14 in alignment with the lower spring plate 46. When mounted on the saddle assembly 44 above and below the axle housing 14 a plurality of holes 50 of the plates 46 and 48 are aligned in pairs to receive elongated fastening members or bolts 52. The upper ends of the bolts 52 include hex heads 54. The lower ends 56 of the bolts 52 are threaded for connection below the lower plate 46 to washer and nut combinations 58. With the plates 46 and 48 mounted on the saddle assembly 44 above and below the axle assembly 14 and leaf springs 22 the nuts 58 are tightened on the bolt threaded ends 56 to compress the leaf springs 22 into contact with the bottom of the saddle assembly 44 and connected to the axle housing 14.

The provision of the spring pack 42, including the spring plates 46 and 48 mounted above and below the saddle assembly 44, connects the leaf springs 22 to the axle housing 14 without the need for U-bolts in contact with the axle housing 14 to carry the weight of the springs 22 on the axle housing 14 as required by the prior art suspension as shown in FIG. 3. The plates 46 and 48 are clamped to the saddle assembly 44 by the tensioned bolts 52. The lower plate 46 receives and supports the weight of the leaf springs 22 and is not connected to U-bolts that suspend from the axle housing 14. The tensioned bolts 52 urge the lower plate 46 to compress the springs 22 against the bottom of the saddle assembly 44. On top of the spring pack 42 the upper plate 48 is rigidly connected to the upper ends of the saddle assembly 44. This provides a solid connection between the leaf springs 22 and axle housing 14, preventing relative spinning movement therebetween.

The plates 46 and 48 are connected by the bolts 52. This transfers the weight of the leaf springs 22 from the saddle assembly 40 to the axle housing 14. In other words, the weight of the leaf springs 22 is not suspended from the axle housing 14 but is not suspended from the axle housing 14 but is carried by the connected plates 46 and 48 clamped to the saddle assembly 44. With the bolts 52 in tension the lower plate 46 compresses the leaf springs 22 against the bottom of the saddle assembly 44. There is no sliding movement of the leaf springs 22 relative to the saddle assembly 44 or the lower plate 46.

Similarly, the upper plate 48 is maintained in rigid engagement with the upper end of the saddle assembly 44 but removed from contact with the axle housing 14. The axle housing 14 is cradled within the saddle assembly 44 so it is thereby connected through the spring pack 42 to the leaf springs 22 without the weight of the leaf springs being suspended directly by U-bolts mounted on the axle housing 14.

In addition to dampening motion transmitted from the axle housing 14 to the vehicle frame 10 by the leaf springs 22, a shock absorber 60 extends between the axle housing 14 and the channel beam 36 of the frame 10. The connection of the shock absorber 60 between the axle housing 14 and the channel beam 36 is accomplished by a bracket 62 extending from the axle housing 14 and an upper mounting bracket 64 having an angular configuration extending outwardly from the reinforced C-section 38. The lower end of the shock absorber 60 is connected through a bushing to the lower bracket 62. A bushing 66 connects the upper end of shock absorber 60 to the upper bracket 64.

For the shock absorber 60 to operate efficiently in dampening motion of the axle housing 14 the shock absorber 60 should be maintained at approximately a 45° angle with respect to the horizontal. With a lowering suspension system the clearance between the top of the axial housing 14 and the vehicle frame 10 is reduced. If the conventional connections for the shock absorber 60 between the axle housing 14 and the frame 10 are utilized when the shock absorber 60 is reconnected, then the angle of the shock absorber with respect to the horizontal is below 45°. This causes the shock absorber to become ineffective in dampening motion transmitted from the axle housing 14.

The present invention maintains efficient operation of the shock absorber 60 by locating the upper mounting brackets 64 on the reinforced C-section 38. With the prior art lowering system, the upper mounting bracket is connected to the frame 10 at a point more distant from the portion of the frame above the axle housing 14. By mounting the angle shaped bracket 64 on the C-section 38 a 45° angle of the shock absorber 60 is maintained. In addition, to assure the necessary clearance between the vehicle frame and the top of the axle housing 14, the C-section 38 includes the recessed portion 40. With the recessed portion 40 there is no interference in the movement of the frame 10 relative to the axle housing 14.

Now referring to FIGS. 5 and 6 there is shown in detail the structure of the saddle assembly 44 for supporting the axle housing 14 above the leaf springs 22. The saddle assembly 44 forms a cradle for the axle housing 14 by the provision of a strap 68 bent in a U-shaped configuration having opposite upper end portions 70 and 72. As seen in FIG. 5, the strap end portion 70 extends at an angle from the vertical and terminates at an elevation above the opposite end portion 72 which extends vertically.

A pair of side plates 74 and 76 are secured by welding two opposite sides of the strap 68. Each of the side plates 74 and 76 includes a semi-circular recess 78 for receiving the axle housing 14. With this arrangement, the axle housing 14 is supported within the recess 78 of the saddle assembly 44. When the upper and lower spring plates 46 and 48 are connected by the bolts 52 a rigid connection is provided between the leaf springs 22 and axle housing 14 without requiring the axle housing 14 to be positioned in immediate contact with the leaf springs 22.

A solid connection is provided by the plates 46 and 48 bolted together so that the leaf springs 22 are supported by the saddle assembly 44 which supports the axle housing 14 without the weight of the springs 22 suspended from the axle housing 14. The compressed spring plates 46 and 48 clamp together the axle housing 14 and the leaf springs 22 without transferring the load of the leaf springs 22 to the axle housing 14.

With the prior art lowering suspension system illustrated in FIG. 3, the leaf springs 22 are hung by a pair of U-bolts 82 and 84 from the axle housing 14. The U-bolts 82 and 84 extend into overlying contact with the axle housing 14 with threaded ends 86 and 88 extending through holes in a support plate 88. Nuts on the bolt threaded ends 86 and 88 are tightened to compress the springs 22 against the bottom of a conventional saddle assembly 90. The conventional saddle assembly 90 includes side walls 92 having a recess for receiving the axle housing 14 and a U-shaped strap 94 having vertically extending upper end portions. The conventional saddle 90 does not include a strap having an extended and angled end portion as the strap end portion 70 shown in FIG. 5 of the present invention. The strap end portions of the conventional saddle 90 both extend vertically and are equal in length.

In a conventional suspension system the axle housing 14 is provided with a spring seat 96 which is utilized with the prior art lowering suspension system shown in FIG. 3, as well as, with the lowering suspension system of the present invention as illustrated in FIG. 4. The spring seat 96 is a channel shaped member that extends transversely across the axle housing 14 and is tack welded thereto. With this arrangement, the spring seat 96 is secured to the axle housing 14.

With the prior art suspension system as shown in FIG. 3, the vertically extending end of the saddle strap 94 abuts the underside of the spring seat 96. Because the ends of the U-shaped strap 94 are the same length the spring seat 96 is maintained in a substantially horizontal position. The U-bolts 82 and 84 are tightened into contact with the axle housing 14. Consequently the weight of the leaf springs 22 is carried by the axle housing 14 clamped to the plate 88. If the spring seat 96 becomes dislodged from the axle housing 14 the weight of the springs 22 can generate a twisting motion transmitted to the axle housing 14. Any twisting motion imparted to the axle housing 14 can break the connection of the drive shaft 20 to the universal joint 18. Therefore, it is important to remove the suspended weight of the leaf springs 22 from the axle housing 14.

With the present invention as illustrated in FIG. 4 the spring seat 96 is also engaged by the upper ends 70 and 72 of the saddle strap 68. However, because the strap end portion 70 extends at an angle and above the elevation of the opposite strap end 72 the spring seat 96 is displaced from the horizontal position of the spring seat of the prior art arrangement illustrated in FIG. 3. By angularly orienting the spring seat 96 on the saddle 44 the axle housing 14 is angularly moved in a direction to move the drive shaft 20 downwardly from the position of the drive shaft with the prior art arrangement. This angular displacement of the drive shaft 20 by the positioning of the spring seat 96 on the saddle assembly 44 of the present invention is diagrammatically illustrated in FIGS. 9 and 10.

FIG. 9 illustrates in the present invention the angle the drive shaft 20 extending from the universal joint 18. Referring to FIG. 10, the solid line 98 represents the angle of the drive shaft 20 with the lowering suspension system of the present invention. The dashed line 100 below the solid line 98 in FIG. 10 illustrates the angular position of a drive shaft where the leaf springs are conventionally positioned above the axle housing 14. The dashed line 102 above the solid line 98 in FIG. 10 illustrates the angular position of the drive shaft for the prior art lowering suspension systems as shown in FIG. 3. This position is also shown by the dashed line 102 in FIG. 9.

When the leaf springs 22 are relocated from above the axle housing 14 to below the axle housing using the lowering suspension system of the prior art, the drive shaft angle is moved to a substantially horizontal position. In this position strain is placed on the drive shaft in its connection from the crank shaft to the universal joint. This angular position of the drive shaft is known to result in vibration of the drive shaft or what is commonly referred to as drive shaft "chatter".

The lowering suspension system of the present invention avoids the problems of drive shaft "chatter" by minimizing the displacement of the drive shaft angle from its conventional position. As seen in FIG. 10 by the solid line 98 while the angle of the drive shaft is displaced from the conventional or stock position it is still below the position encountered with the prior art. This is accomplished by the saddle assembly 44 having the strap extension 70 displacing the spring seat 96 to rotate the axle assembly 14 to a corrected position. This minimizes the dislocation of the drive shaft from its normal position when the leaf springs are relocated below the axle housing 14. Therefore, with the present invention the manner in which the leaf springs 22 are supported below the axle housing 14 permits the drive shaft angle to be as close as possible to the angle of the stock suspension system. This also serves to minimize axle spin that can occur when the drive shaft angle is displaced to the degree encountered with the prior art arrangement.

According to the provisions of the patent statutes, I have explained the principle, preferred construction, and mode of operation of my invention and have illustrated and described what I now consider to represent its best embodiments. However, its should be understood that, within the scope of the appended claims, the invention may be practiced otherwise than as specifically illustrated and described.

I claim:

1. Apparatus for lowering the suspension system on a vehicle frame comprising, a vehicle frame, an axle housing extending transversely relative to said vehicle frame, a leaf spring assembly extending longitudinally on said vehicle frame underlying said axle housing, said leaf spring assembly having opposite end portions, brackets on said frame connected to opposite ends of said leaf spring assembly, a saddle positioned on said leaf spring assembly, said axle housing received on said saddle above said leaf spring assembly and removed from contact therewith, a spring pack supported by said saddle connecting said leaf spring assembly to said axle housing, said spring pack including a first spring plate underlying said leaf spring assembly below said axle housing and a second spring plate overlying said saddle above said axle housing, a plurality of elongated fastening members extending between said first and second spring plates, and said fastening members being placed under tension to compress said first spring plate into contact with said leaf spring assembly and said second spring plate in contact with said saddle and removed from contact with said axle housing to transfer the weight of said leaf spring assembly through said spring pack and said saddle to said axle housing.

2. Method for lowering the suspension system on a vehicle frame comprising the steps of, lowering a leaf spring assembly below an axle housing, extending the leaf spring assembly longitudinally on the vehicle frame transverse to the axle housing, positioning a saddle on the leaf spring assembly, positioning the axle housing on the saddle above said leaf spring assembly and removed from contact therewith, positioning a first spring plate beneath the leaf spring assembly in underlying relation with the axle housing, positioning a second spring plate on the saddle above the axle housing, and clamping together the first and second spring plates by tensionable members to support the leaf spring assembly in contact with the saddle below the axle housing and transfer the weight of the leaf spring assembly to the axle housing through the saddle.

3. A kit for lowering a suspension on a vehicle frame below an axle housing comprising, a saddle assembly having a recessed portion for receiving and supporting the axle housing on a leaf spring assembly, a pair of clamping plates forming a spring pack to connect the axle housing through the saddle assembly to the leaf spring assembly, said spring pack assembled on said saddle assembly with said pair of plates aligned in overlying clamping relation with said saddle assembly, elongated fastening members connected to and extending between said pair of plates with one spring plate supported by said saddle assembly above the axle housing and a second spring plate positioned below said saddle assembly in underlying relation with the leaf spring assembly, and tightening devices positioned on said fastening members to place said fastening members in tension so that the weight of the leaf spring assembly is transferred through said spring pack and said saddle assembly to the axle housing.

4. Apparatus for lowering the suspension system on a vehicle frame as set forth in claim 1 in which, said saddle has a recessed area for receiving said axle housing, said axle housing supported within said recessed area of said saddle, and said saddle positioned on said leaf spring assembly.

5. Apparatus for lowering the suspension system on a vehicle frame as set forth in claim 1 which includes, said leaf spring assembly extending between said saddle and said first spring plate, and said leaf spring assembly supported by said first spring plate being connected by said fastening members to said record spring plate being supported by said saddle.

6. Apparatus for lowering the suspension system on a vehicle frame as set forth in claim 1 in which, said fastening members include bolts, said first spring plate positioned beneath said leaf spring assembly in alignment with said second spring plate being positioned on top of said saddle, said bolts extending through aligned holes in said first and second spring plates, and means for tensioning said bolts between said first and second spring plates to compress said leaf spring assembly into contact with the bottom of said saddle and connected to said axle housing.

7. Apparatus for lowering the suspension system on a vehicle frame as set forth in claim 6 which includes, said leaf spring assembly being connected to said axle housing with the weight of said leaf spring assembly supported by said first spring plate being compressed by said bolts under tension against the bottom of said saddle to prevent relative spinning movement between said leaf spring assembly and said axle housing.

8. Apparatus for lowering the suspension system on a vehicle frame as set forth in claim 6 which includes, said first and second spring plates being connected by said bolts to compress said first spring plate against said leaf spring assembly and compress said leaf spring assembly against said saddle to transfer the weight of said leaf spring assembly from said saddle to said axle housing.

9. Apparatus for lowering the suspension system on a vehicle frame as set forth in claim 1 in which, said axle housing is cradled within said saddle and thereby connected through said first and second spring plates compressed into contact with said leaf spring assembly and said saddle respectively to remove the weight of said leaf spring assembly from being suspended from said axle housing.

10. Apparatus for lowering the suspension system on a vehicle frame as set forth in claim 1 which includes, said first spring plate being positioned in underlying relation with said leaf spring assembly to receive and support said leaf spring assembly, and said fastening members being tensioned to compress said first spring against the bottom of said saddle and said second spring plate against the top of said saddle.

11. Apparatus for lowering the suspension system on a vehicle frame as set forth in claim 1 which includes, a shock absorber extending between said vehicle frame and said axle housing, and bracket means connected to said vehicle frame and said axle assembly for connecting said shock absorber to said vehicle frame and said axle assembly to extend at an angle no less than 45° with respect to a horizontal plane of said axle assembly.

12. Apparatus for lowering the suspension system on a vehicle frame as set forth in claim 11 which includes, said vehicle frame having a reinforced beam with a recessed portion spanning said axle housing to provide additional clearance between said vehicle frame and said axle housing and prevent interference in the movement of said vehicle frame relative to said axle housing, and said bracket means including a portion connected to said reinforced beam adjacent to said recessed portion.

13. Method as set forth in claim 2 which includes, supporting the leaf spring assembly on the first spring plate, connecting the first spring plate by bolts to the second spring plate, and supporting the second spring plate by the saddle.

14. Method as set forth in claim 13 which includes, tensioning the bolts to compress the leaf spring assembly into contact with the saddle, and connecting the leaf spring assembly through the saddle to the axle housing.

15. Method as set forth in claim 13 which includes, tensioning the bolts to compress the first and second spring plates to transfer the weight of the leaf spring assembly from the saddle to the axle housing, and carrying the weight of the leaf spring assembly by the saddle connected to the axle housing.

16. Method as set forth in claim 2 which includes, cradling the axle housing within the saddle, and compressing the first and second spring plates to the saddle to transfer the weight of the leaf spring assembly to the saddle without the weight of the leaf spring assembly being suspended from the axle housing.

17. Method as set forth in claim 2 which includes, supporting the axle housing by the saddle to locate the axle housing in a preselected position to support a drive shaft at an angle below a horizontal position.

18. A kit for lowering a suspension on a vehicle frame below an axle housing as set forth in claim 3 in which, said fastening members include bolts extending through aligned holes in said pair of spring plates, and nuts on threaded ends of said bolts tightened to tension said bolts to rigidly connect said one spring plate to a top surface of said saddle assembly and urge said second spring plate to compress the leaf spring assembly against a bottom surface of said saddle assembly.

19. A kit for lowering a suspension on a vehicle frame below an axle housing as set forth in claim 3 in which, said saddle assembly includes a U-shaped strap forming a cradle for receiving the axle housing, said strap having a pair of upper end portions for receiving said one spring plate and a bottom surface for receiving said second spring plate, and said pair of spring plates when connected by said fastening members providing a rigid connection between the leaf spring assembly and the axle housing without requiring the axle housing to be positioned in immediate contact with the leaf spring assembly.

20. A kit for lowering a suspension on a vehicle frame below an axle housing as set forth in claim 19 in which, one of said pair of strap upper end portions has a length greater than the other upper end portion and extends at an angle toward the other upper end portion, and a spring seat supported by said strap upper end portions and displaced from a horizontal position on said saddle assembly.

\* \* \* \* \*

UNITED STATES PATENT AND TRADEMARK OFFICE
CERTIFICATE OF CORRECTION

PATENT NO. : 5,599,038
DATED : Feb. 4, 1997
INVENTOR(S) : Mark K. German

It is certified that error appears in the above-identified patent and that said Letters Patent is hereby corrected as shown below:

Column 3, line 34        after "housing" insert —to—.

Column 8, line 38        after "However," delete 'its' and insert -- it --.

Signed and Sealed this

Twenty-fourth Day of March, 1998

Attest:

BRUCE LEHMAN

Attesting Officer          Commissioner of Patents and Trademarks